United States Patent
Murphy et al.

(10) Patent No.: US 10,348,942 B2
(45) Date of Patent: Jul. 9, 2019

(54) PORTABLE DESKTOP VIDEO MAGNIFIER CAMERA

(71) Applicant: Freedom Scientific, Inc., St. Petersburg, FL (US)

(72) Inventors: Patrick Murphy, Riverview, FL (US); Todd Conard, Ruskin, FL (US); Bradley S. Davis, Largo, FL (US); Carlos M. Rodriguez, Palm Harbor, FL (US); Michael Goldenberg, Melbourne, FL (US)

(73) Assignee: Freedom Scientific, Inc., Clearwater, FL (US)

( * ) Notice: Subject to any disclaimer, the term of this patent is extended or adjusted under 35 U.S.C. 154(b) by 507 days.

(21) Appl. No.: 14/830,576

(22) Filed: Aug. 19, 2015

(65) Prior Publication Data

US 2016/0057322 A1     Feb. 25, 2016

Related U.S. Application Data

(60) Provisional application No. 62/039,261, filed on Aug. 19, 2014.

(51) Int. Cl.
*H04N 5/225* (2006.01)
*G09G 3/20* (2006.01)
*H04N 1/00* (2006.01)

(52) U.S. Cl.
CPC ......... *H04N 5/2252* (2013.01); *G09G 3/2092* (2013.01); *H04N 1/00* (2013.01); *H04N 5/2256* (2013.01)

(58) Field of Classification Search
USPC .................................................. 348/63, 156
See application file for complete search history.

(56) References Cited

U.S. PATENT DOCUMENTS

| | | | |
|---|---|---|---|
| 6,064,426 A * | 5/2000 | Waterman | H04N 7/183 348/63 |
| 7,336,295 B2 | 2/2008 | Sukenari et al. | |
| 7,825,949 B2 | 11/2010 | Trulaske | |
| 8,681,268 B2 | 3/2014 | Reznik et al. | |
| 9,122,320 B1 * | 9/2015 | Rowles | G06F 3/0317 |
| 2003/0089832 A1 * | 5/2003 | Gold | A45F 5/02 248/454 |
| 2003/0095200 A1 | 5/2003 | Nagano | |

(Continued)

FOREIGN PATENT DOCUMENTS

| | | |
|---|---|---|
| DE | 102011075273 A1 | 11/2012 |
| EP | 1921838 A2 | 5/2008 |

(Continued)

*Primary Examiner* — Tyler W. Sullivan
(74) *Attorney, Agent, or Firm* — GrayRobinson, P.A.; Michael J. Colitz, III

(57) ABSTRACT

Disclosed is a portable magnifier camera with both storage and deployed configurations. In the storage configuration, the entire assembly can be carried via an associated handle. The camera is designed to rest on a desktop, or other planar surface, in the deployed configuration. When deployed, a housing and camera arm are positioned in a cantilevered arrangement over top of an object to be viewed. A camera housing, with an associated camera, is pivotally connected to the camera arm and is positioned over the object upon the camera being placed into a deployed configuration.

6 Claims, 4 Drawing Sheets

(56) References Cited

U.S. PATENT DOCUMENTS

| | | | |
|---|---|---|---|
| 2005/0122396 A1* | 6/2005 | Mizukami | G03B 15/03 348/63 |
| 2009/0059038 A1 | 3/2009 | Seakins et al. | |
| 2010/0026854 A1* | 2/2010 | Rodriguez | H04N 1/195 348/240.99 |
| 2011/0074940 A1 | 3/2011 | Goldenberg et al. | |
| 2014/0022364 A1* | 1/2014 | Rodriguez | G03B 17/04 348/63 |
| 2014/0176690 A1* | 6/2014 | Hamel | G02B 27/026 348/63 |
| 2015/0066511 A1* | 3/2015 | Baek | H04N 5/23293 704/260 |
| 2015/0304518 A1* | 10/2015 | Rodriguez Diaz | H04N 1/40056 358/473 |

FOREIGN PATENT DOCUMENTS

| | | | |
|---|---|---|---|
| JP | 3773457 B2 * | 5/2006 | |
| JP | 3773457 B2 | 5/2006 | |

\* cited by examiner

PORTABLE DESKTOP VIDEO MAGNIFIER CAMERA

CROSS REFERENCE TO RELATED APPLICATIONS

This application claims priority to U.S. Application Ser. No. 62/039,261, filed Aug. 19, 2014, and entitled "Portable Desktop Video Magnifier Camera," the contents of which are fully incorporated herein for all purposes.

TECHNICAL FIELD

This disclosure relates to a video magnifier. More particularly, the present disclosure relates to a desktop video magnifier that is portable.

BACKGROUND OF THE INVENTION

Video magnifiers are important tools for blind and/or low vision ("BLV") users. These devices allow BLV users to view objects and/or text by positioning an associated camera and selecting a desired level of magnification. Color contrasting and image rotation can also be provided to ease viewing. Video magnifiers typically include a camera and an associated monitor. The camera is often mounted on an arm that can be positioned over the object to be viewed. A separate controller can be used to change: magnification level; the position of the image upon the screen; contrast; as well as other image features.

Video magnifiers have typically been designed to permanently reside on a table or desktop. An example of a desktop magnification system is illustrated by U.S. Pat. No. 7,825,949 to Trulaske. Trulaske illustrates a closed circuit video magnification system. The system incorporates a base upon which the operating components of the system are mounted. The system also includes a platform that is shiftable both laterally and depth-wide for viewing the matter to be scanned. A camera is mounted upon arms over the table. Although Trulaske is beneficial for viewing objects place upon the platform, it suffers from a lack of transportability. Namely, Trulaske includes many moving parts and cannot be efficiently folded for transport or storage.

The portability of video magnifiers has often proved problematic. For example, U.S. Pat. No. 7,336,295 to Sukenari discloses a video magnifier having a rectangular display screen. A camera holder is detachably attached to a mounting section. A tilting mechanism is included for inclining the monitor. However, Sukenari, as with most other portable magnifiers, must be at least partially or totally disassembled for storage and transport. Even for sighted users, this is far from an ideal solution. It is an especially problematic solution for BLV users, who often times cannot carry out the disassembly/assembly process. Efforts have been made over the years to provide truly portable video magnifiers. However, many portable magnifier cameras are designed to be handheld, which can be problematic in the event the user needs both hands free while viewing the object.

What is needed, therefore, is a desktop video magnifier that is transportable with stored and deployed configurations and that employs a camera at a fixed location over the object plane. The video magnifier of the present disclosure is designed to fulfill these and other shortcomings present with existing video magnifiers.

SUMMARY OF THE INVENTION

This disclosure provides a desktop video magnifier that is portable with both a storage and a deployed configuration.

The disclosed system has several important advantages. For example, the video magnifier uses a camera at a fixed location over an object plane.

Another advantage is realized by providing a video magnifier that although designed for desktop use is readily transportable by blind and/or low vision users.

A further possible advantage is achieved by employing a camera arm that has collapsed and extended orientations.

Still yet another possible advantage is achieved by providing a carrying handle for a desktop video magnifier.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

| Parts List |
| --- |
| 10 Camera Assembly |
| 20 Base |
| 22 Hinges |
| 30 Housing |
| 32 Power Cord/Inlet |
| 34 Illumination Panel |
| 40 Monitor Arm |
| 52 Camera Arm |
| 54 Camera |
| 60 Monitor |
| 62 Control Knobs |
| 64 Control Buttons |
| 66 Self-View Camera |
| 68 Shudder for Self-View Camera |
| H Handle |

DETAILED DESCRIPTION OF THE DRAWINGS

The present disclosure relates to a magnifier camera. The camera has both storage and deployed configurations. In the storage configuration, the entire assembly can be carried via an associated handle. The camera is designed to rest on a desktop, or other planar surface, in the deployed configuration. When deployed, a monitor arm is positioned in a cantilevered arrangement over top of an object to be viewed. A camera housing, with an associated camera, is pivotally connected to the monitor arm. The camera can be positioned over the object to be viewed when in the deployed configuration. The various features of the present disclosure, and the manner in which they interrelate, are described in greater detail hereinafter.

Figure 1:
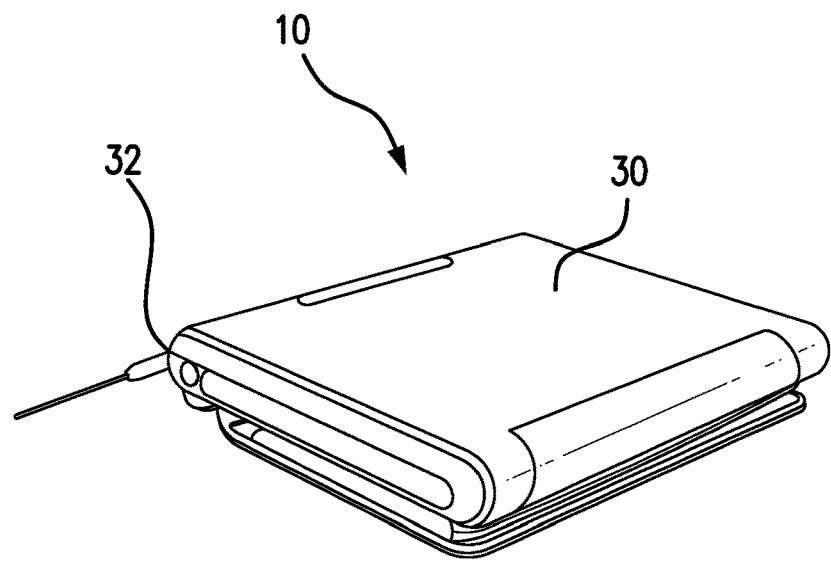
FIG. 1 is a perspective view of the magnifier in the storage configuration.
Figure 2:
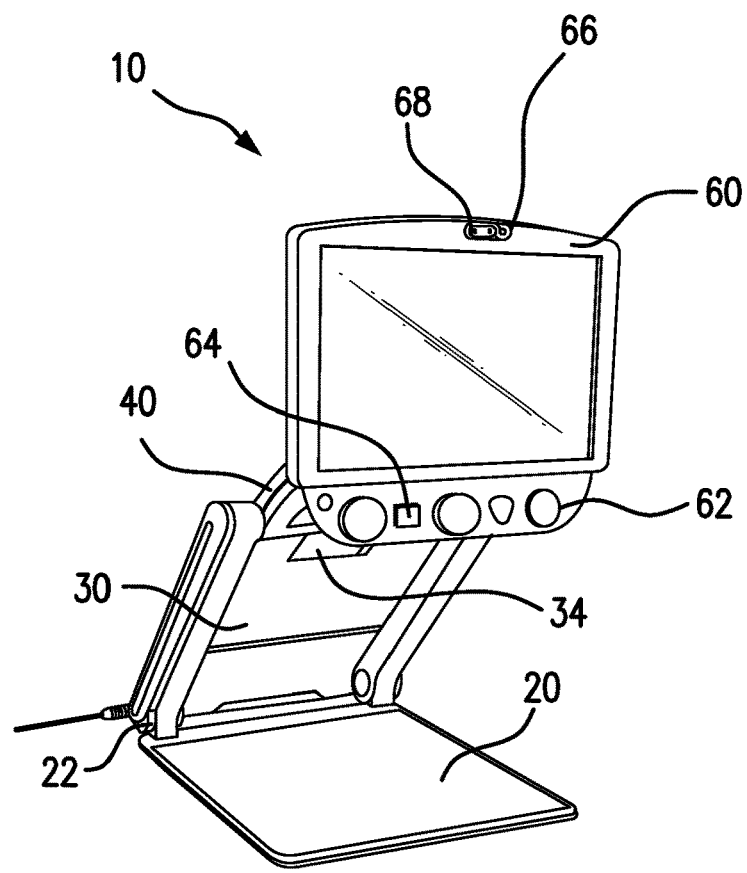
FIG. 2 is a perspective view of the magnifier camera in the deployed configuration.

With reference now to FIGS. 1 and 2, the camera assembly 10 is illustrated in the storage configuration. In this configuration, the assembly can be easily carried or stored by the user. Assembly 10 broadly includes a base 20, a housing 30, a monitor arm 40, a camera arm 52 (FIG. 4), and a monitor 60. These elements are pivotally connected to one another. This allows assembly 10 to be easily converted from the storage configuration (FIG. 1) to the deployed configuration (FIG. 2).

Base 20 includes a set of hinges 22 for pivotally interconnecting housing 30. Housing 30 forms the cover for magnifier 10 when in its stowed orientation. Housing 30 further includes an interior compartment for accepting monitor arm 40 and monitor 60 when magnifier 10 is stowed. Housing 30 includes end caps for retaining the opposing portions of housing 30 and for enclosing associated fasteners. End caps can also house counter balancing springs, which are engaged upon raising or lowering housing 30. Hinges 22 each include two distinct detent positions. The first detent position corresponds to housing 30 being in facing relation to base 20. Second detent position corresponds to housing 30 being at approximately a 45° to a 50° angle with respect to base 20. This corresponds to the deployed configuration. Base 20 also operates as a stand to allow camera 10 to rest upon a desk or other surface. It further function as a support for the object being viewed.

Objects being viewed are illuminated via an illumination panel 34 positioned on the inside of housing 30. Panel 34 is preferably formed by two rows of aligned LEDs, with each row being positioned at an opposite side of panel 34. Panel 34 itself includes one of more sheets of a reflective material to reflect and dissipate the light generated by the LEDs. The result is an LCD-type panel 34 that generates a uniform amount of light for the object being viewed. The entire assembly 10, including panel 34, can be powered via an external power supply via a DC power jack or inlet 32 within housing 30. Power jack 32 can also be used to charge a rechargeable battery, such as a Lithium Ion battery. Battery is preferably positioned within the lower extent of housing 30.

Housing 30 is pivotally connected to a U-shaped monitor arm 40. U-shaped arm 40 includes first and second ends; the first end pivotally connects to housing 30, while the opposite end pivotally connects to the back side of monitor 60. This allows monitor 60 to be fully articulated with respect to arm 40. The U-shaped nature of the arm 40 creates a space for accepting camera housing 52. A variety of different monitor sizes can be supported by arm 40. For example, a 10", 12" or even 15" inch monitor can be supported depending upon the anticipated use of assembly 10.

Figure 3:
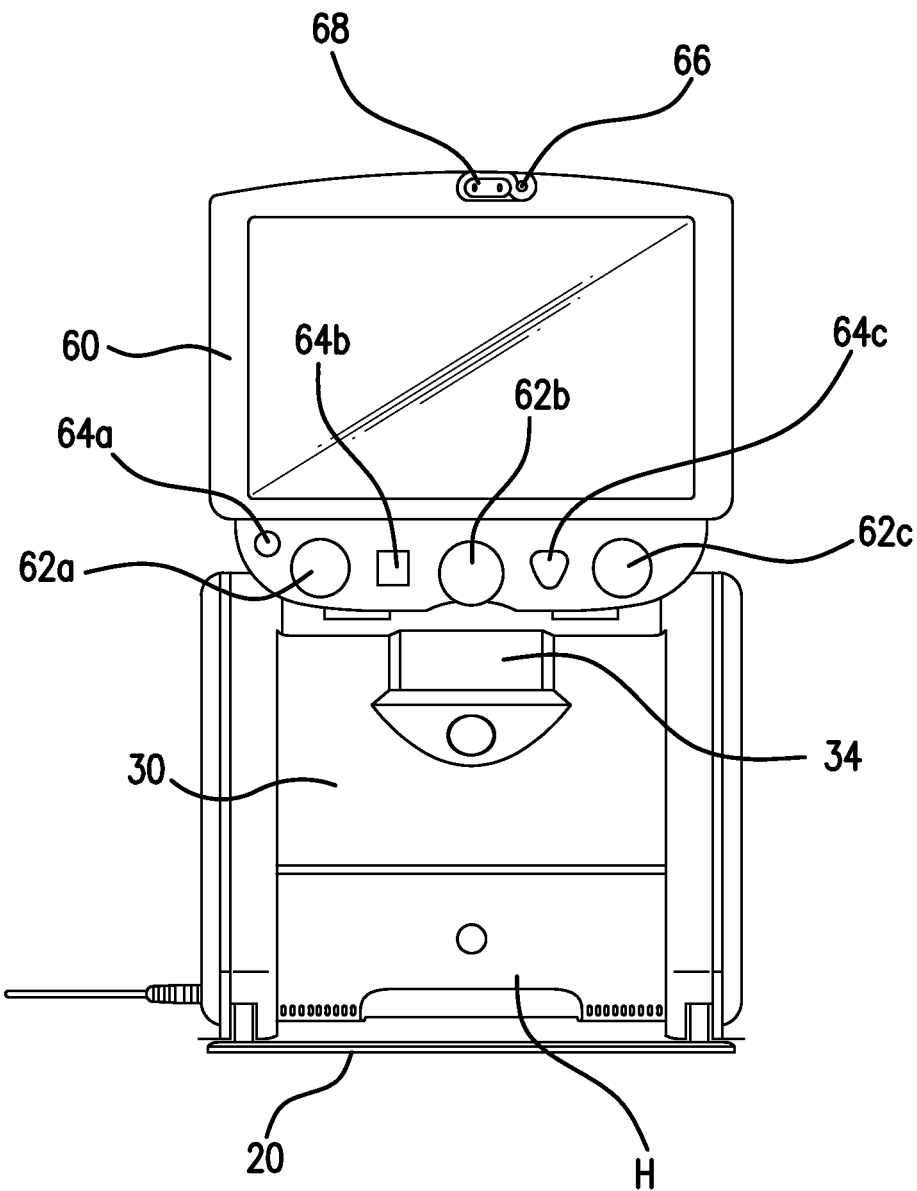
FIG. 3 is a front elevational view of the camera in the deployed configuration.

Monitor 60 includes a lower bezel or control panel with both a number of rotatable control knobs 62 and a number of push buttons 64. In the depicted embodiment, there are a series of three control buttons 64a, 64b, and 64c and three control knobs 62a, 62b, 62c (FIG. 3). By way of non-limiting example, the 64a is an advance feature button. When used with other controls, this button permits the user to perform advanced features. 62a is a brightness dial, which can be rotated clockwise or counter clockwise to increase or decreases the brightness of monitor 60. Push button 64b is a free frame button. Depressing this one freezes the image on monitor 60. Depressing button 64b a second time return to a live image. Button 64b can be held down along with advance feature button 64a in order to save images to a memory card, such as an SD card. An SD card slot is included along the periphery of monitor 60. Dial 62b allows the user to increase and decrease the magnification of the displayed image. Button 64c is a find button. Depressing and holding find button 64c reduces the magnification level so that the entire image can be viewed. It also places cross hairs over the center of the enlarged portion of the image so that the enlarged image can be viewed in context. This gives the user a better understanding of where the enlarged image is located. Dial 62c is a color mode dial that can be rotated to cycle through various color modes.

Monitor 60 may likewise include a self-view camera 66, which would preferably be included along the top of the bezel. Camera 66 would allow the user to view themselves or for video messaging. Camera 66 allows the user to view enlarged images of themselves. Magnification levels of 2.5× and greater can be supported. A manual shudder 68 can be included to address privacy concerns and prevent camera 66 from viewing the user. Camera 66 can be configured such that it is operable when shudder 68 is opened and inoperable when shudder 68 is closed.

Magnifier assembly 10 may optionally include a USB port to allow the device to be coupled to an external computer. This may be desirable, for example, if magnifier 10 is to be used for on-screen measurements or for optical character recognition. Coupling magnifier 10 to an external computer also allows for captured images to be stored and processed by the external computer. Assembly 10 may also optionally include a Wi-Fi connection and video compression to allow streaming videos to be viewed by monitor 60.

Figure 4:
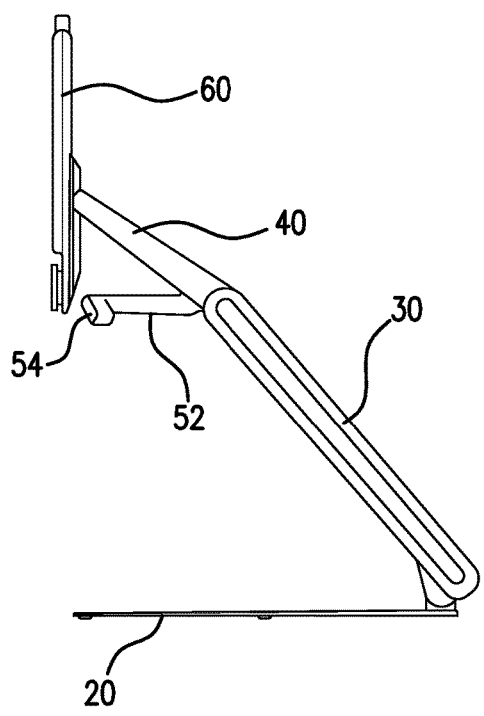
FIG. 4 is a side elevational view of the camera in the deployed configuration with the monitor in an elevated position.
Figure 5:
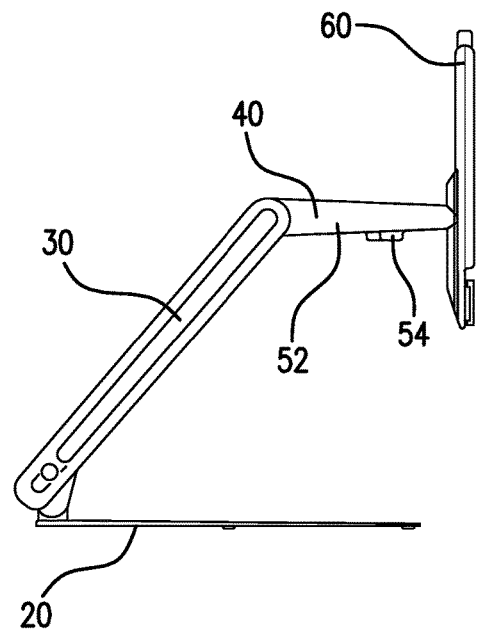
FIG. 5 is a side elevational view of the camera in the deployed configuration with the monitor in a non-elevated position.

When in the storage configuration (FIG. 1), housing 30 overlies monitor 60, thereby protecting the associated screen. The entire assembly can also be carried via handle H (FIG. 3), which is positioned along one side of the assembly 10. The deployed configuration is achieved by pivoting housing 30 upwardly until the detent is engaged (approximately 45° angle relative to the base). The monitor arm 40 is then pivoted up to the position depicted in FIG. 5. Importantly, camera arm 52 rotates along with the monitor arm 40 via an included spring. However, a stop is included such that camera arm 52 stops rotating when camera arm 52 is parallel with the base 20 (FIG. 4). In other words, camera arm 52 cannot rotate past a horizontal orientation. The monitor arm 40 can continue its rotation to the position depicted in FIG. 4 after camera arm 52 stops its rotation. This arrangement ensures that camera 54 is always perpendicular to the underlying object plane. This eliminates the "keystoning" effect that would otherwise occur if the camera were orientated at an angle.

Figure 6A:
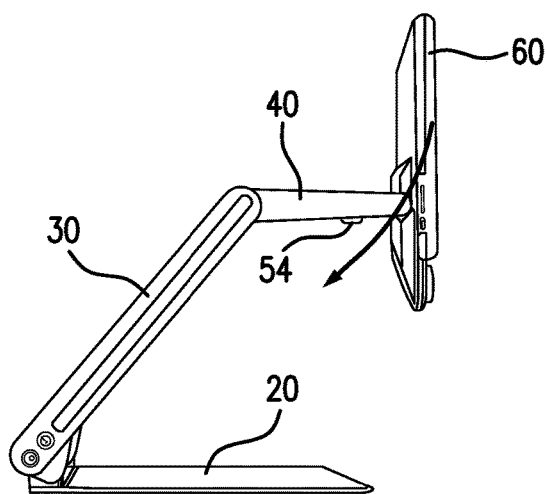
FIGS. 6a-d illustrate how the magnifier can be folded from the deployed to the stored configuration.
Figure 6B:
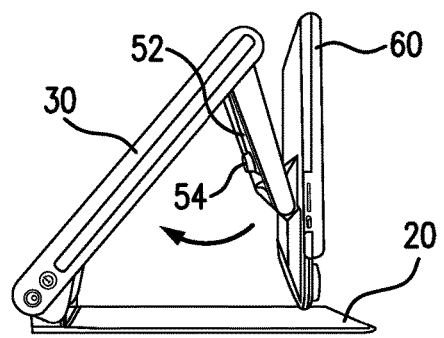
Figure 6C:
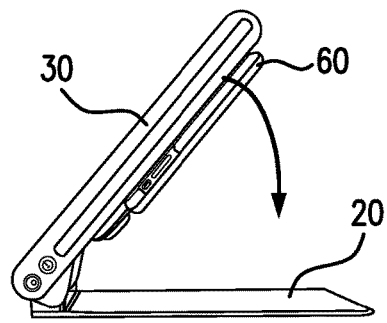
Figure 6D:
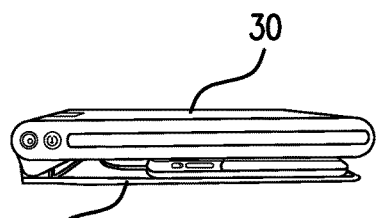

The sequence for collapsing the assembly is depicted in FIGS. 6a-6c. As illustrated, the user begins the process by manipulating monitor 60. Namely, monitor 60 and monitor arm 40 are pivoted downwardly to engage camera arm (or housing) 52 (note FIG. 6a). Next, as illustrated in FIG. 6b, camera arm 52, monitor arm 40, and monitor 60 are rotated together to fit within the underside of housing 30. In this orientation, the face of monitor 60 is facing away from housing 30. Thereafter, as noted in FIG. 6c, housing 30 is rotated into facing relation with base 20. The final collapsed configuration is illustrated in FIG. 6d. Arm 40 and housing 30 can include internal magnets, or similar sensors, whereby assembly 10 is automatically powered on when in the deployed configuration and automatically powered down when in the collapsed configuration. Notably, in the collapsed configuration, monitor screen 60 is in facing relationship with, and protected by, base 20.

Thus, magnifier camera 10 has a stowed orientation (FIG. 6d) wherein monitor arm 40 and monitor 60 are folded into the compartment of the housing 30 and housing 30 is pivoted into facing relationship with base 20. Magnifier camera 10 also has a deployed orientation wherein base 20, housing 30, monitor arm 40, and monitor 60 are all angled with respect to one another (FIG. 4).

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A transportable video magnifier camera for table top use, the video magnifier camera adapted to display enlarged images of an object, the magnifier camera comprising in combination:
    a base adapted to support the magnifier camera upon the table, the base having an upper surface for supporting the object to be viewed;
    a housing pivotally connected to the base, the housing having a back wall and an internal compartment, a lighting panel within the internal compartment, the lighting panel functioning to illuminate the object to be viewed;
    a flat panel monitor for displaying images of the object to be viewed, the monitor having a top edge, a bottom edge, and an intermediate extent therebetween, the monitor having front and back faces with a screen in the front face, the monitor including a bezel along the bottom edge with a series of rotatable and push button controls, the controls functioning to selectively vary brightness, magnification, and color contrast;
    a self-view camera positioned within a top edge of the monitor;
    a U-shaped monitor arm, the U-shaped arm having first and second ends, and an interior area, the first end being pivotally connected to the housing and the second end being pivotally connected to the intermediate extent of the monitor;
    a camera pivotally connected to the monitor arm by way of a camera arm, the camera arm having a first orientation wherein it is disposed within the interior area of the U-shaped monitor arm and a second orientation wherein the camera arm is at an angle relative to the monitor arm;
    the magnifier camera having a stowed orientation wherein the monitor arm and camera arm are folded into and in contact with the internal compartment of the housing and in facing relationship with the lighting panel, and wherein the back face of the monitor contacts and is in facing relationship with the camera arm and the screen contacts and is in facing relationship with the upper surface of the base, the magnifier camera also having a deployed orientation wherein the housing and monitor arm form an obtuse angle and the monitor is spaced from the base, the magnifier camera further including a self-view orientation wherein the housing and monitor arm form an acute angle and the monitor is positioned adjacent to the base.

2. A transportable magnifier camera comprising:
    a base adapted to support the magnifier camera and an object to be viewed;
    a housing pivotally connected to the base, the housing having a back wall and an interior compartment with a lighting panel;
    a monitor for displaying images of the object to be viewed, the monitor including upper and lower edges and an intermediate extent therebetween;
    a self-view camera positioned within the upper edge of the monitor;
    a monitor arm having a first end pivotally connected to the housing and a second end pivotally connected to the intermediate extent of the monitor, the monitor arm including an interior area;
    a camera pivotally connected to the magnifier camera by way of a camera arm;
    the magnifier camera having a stowed orientation wherein the camera arm is positioned within and contacts the interior area and the monitor arm contacts and is within the interior compartment, and wherein the monitor contacts and is in facing relation to the base, the magnifier camera also having a deployed orientation wherein the housing and monitor arm form an obtuse angle and the monitor is spaced from the base, the magnifier camera further including a self-view orientation wherein the housing and monitor arm form an acute angle and the monitor is positioned adjacent to the base.

3. The magnifier camera as described in claim 2 wherein the monitor further includes a lower bezel with a series of rotatable and push button controls.

4. The magnifier camera as described in claim 3 wherein the controls function to selectively vary brightness, magnification, and color contrast.

5. The magnifier camera as described in claim 2 wherein the monitor arm is U-shaped, and wherein the camera has a first orientation wherein it is disposed within the interior area and a second orientation wherein the camera arm is at an angle relative to the monitor arm.

6. The magnifier camera as described in claim 2 wherein the lighting panel includes a sheet of reflective material and adjacent rows of light emitting diodes.

* * * * *